United States Patent [19]

Rave

[11] 3,717,592
[45] Feb. 20, 1973

[54] CROSS-LINKING EPIHALOHYDRIN POLYMERS

[75] Inventor: Terence W. Rave, Wilmington, Del.

[73] Assignee: Hercules Incorporated, Wilmington, Del.

[22] Filed: Jan. 27, 1971

[21] Appl. No.: 110,322

Related U.S. Application Data

[63] Continuation-in-part of Ser. No. 822,036, May 5, 1969, abandoned.

[52] U.S. Cl..................260/2 A, 204/159.18, 260/61, 260/75 H, 260/79

[51] Int. Cl. .............................................C08g 23/20

[58] Field of Search................260/2 A, 75 H, 61, 79; 204/159.18

[56] References Cited

UNITED STATES PATENTS

| | | | |
|---|---|---|---|
| 3,226,381 | 12/1965 | Breslow et al. | 260/239 |
| 3,284,421 | 11/1966 | Breslow et al. | 260/80.5 |
| 3,285,862 | 11/1966 | Vandenberg | 260/2 |
| 3,361,724 | 1/1968 | Watson et al. | 260/79.1 |
| 3,432,445 | 3/1969 | Osgan et al. | 260/2 |
| 3,457,197 | 7/1969 | Hsieh et al. | 260/2 |
| 3,474,045 | 10/1969 | Vandenberg et al. | 260/2 |

FOREIGN PATENTS OR APPLICATIONS 1,268,378   5/1968   Germany

*Primary Examiner*—William H. Short
*Assistant Examiner*—E. A. Nielsen
*Attorney*—Marion C. Staves, Charles L. Board and Edwin H. Dafter

[57] ABSTRACT

Epihalohydrin polymers can be cross-linked by reaction with a poly(diazoacetate) having the general formula

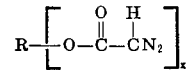

where $x$ is an integer greater than 1 and R is an organic radical inert to modification reactions. The reaction between the poly(diazoacetate) and polymer can be initiated either by heating or by exposing to ultraviolet radiation.

7 Claims, No Drawings

CROSS-LINKING EPIHALOHYDRIN POLYMERS

This application is a continuation-in-part of my copending application Ser. No. 822,036, filed May 5, 1969 now abandoned.

This invention relates to modifying certain non-hydrocarbon polymers and to the products so produced. More particularly, the invention relates to cross-linking epihalohydrin polymers with certain poly(diazo) compounds and to the product so produced.

Epihalohydrin polymers are well known and can be used in diverse specialty rubber applications. However, in many uses the polymers must be cross-linked or otherwise modified to offer the best physical properties. Various methods are reported in the prior art for cross-linking these polymers. However, all the methods offer certain drawbacks.

Now in accordance with this invention it has unexpectedly been found that epihalohydrin polymers can be cross-linked with poly(diazoacetates) to produce vulcanizates that are tough, resilient, solvent-resistant, and odor free.

The poly(diazoacetates) useful in the process of this invention have the general formula

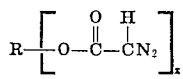

where $x$ is an integer greater than 1, preferably from 2 to 100, most preferably from 2 to 4 and R is an organic radical inert to modification reactions. While R in the above formula can be any polyvalent organic radical which does not interfere with the modification reaction, it will preferably be an organic radical selected from the group consisting of radicals derived by the removal of two or more hydrogen atoms from alkanes such as, for example the straight and branched $C_2$—$C_{100}$, most preferably $C_2$—$C_{20}$, alkanes which include, for instance, ethane, propane, butane, isobutane, pentane and its isomers, hexane and its isomers, octane and its isomers, decane and its isomers, dodecane and its isomers and octadecane and its isomers; cycloalkanes such as, for example, the $C_3$—$C_{100}$, most preferably $C_3$—$C_{20}$, cycloalkanes which include, for instance cyclopropane, cyclobutane, cyclopentane, cyclohexane and cyclooctane; alkyl-cycloalkanes such as, for example, the $C_1$—$C_{20}$ alkyl-($C_3$—$C_{20}$) cycloalkanes which include for instance, ethylcyclohexane and methylcyclobutane; arenes such as benzene, naphthalene and diphenyl; alkyl substituted arenes such as, for example, the $C_1$—$C_{20}$ alkyl substituted arenes which include, for instance, toluene, ethylbenzene, o-, m- and p-xylene and o-, m- and p-diethylbenzene; alkylene-diarenes such as, for example, the $C_1$—$C_{20}$ alkylene-diarenes which include, for instance, diphenylmethane, 1,2-diphenylethane, 1,1-diphenylpropane, 1,3-diphenylpropane and 2,2-diphenylpropane; dialkylcycloalkanes such as, for example, the ($C_1$—$C_{20}$) alkyl-($C_3$—$C_{20}$) cycloalkanes which include, for instance, 1,2-, 1,3- and 1,4-dimethylcyclohexane and 1,2- and 1,3-dimethylcyclopentane; and the alkyloxyalkanes, aryloxyarenes, alkaryloxyarenes, alkaryloxyalkarenes, aralkyloxyalkanes, aralkyloxyaralkanes and alkyloxyalkarenes as well as the corresponding thio and sulfonyl compounds, specific examples of which include diethyl ether, propyl butyl ether, diphenyl ether, oxy-bis(p-methyl benzene), oxy-bis(phenyl methane), diethyl thioether, diphenyl thioether, diphenylmethyl thioether and butylsulfonyl butane; and the foregoing compounds with fluoro, chloro, bromo and iodo substituents. Exemplary of these poly(diazoacetate) compounds are the bis(diazoacetate) esters of ethylene glycol, 1,2-propanediol, 1,3-propanediol, 1,4-butanediol, 1,3-butanediol, 2,3-butanediol, 1,5-pentanediol, 2,3-pentanediol, 1,4-pentanediol, 2,4-pentanediol, 1,3-pentanediol, 1,6-hexanediol, 1,5-hexanediol, 1,4-hexanediol, 1,3-hexanediol, 1,2-hexanediol, 2,3-hexanediol, 2,4-hexanediol, 2,5-hexanediol, 1,7-heptanediol, 1,6-heptanediol, 1,5-heptanediol, 1,3-heptanediol, 2,4-heptanediol, 2,6-heptanediol, 3,5-heptanediol, 1,8-octanediol, 1,6-octanediol, 1,5-octanediol, 1,3-octanediol, 1,2-octanediol, 2,3-octanediol, 3,7-octanediol, 1,9-nonanediol, 1,10-decanediol, 1,11-undecanediol, 1,12-dodecanediol, 1,14-tetradecanediol, 1,16-hexadecanediol and 1,18-octadecanediol; the tris(diazoacetate) esters of 1,2,3-propanetriol, 1,1,1-trimethylolethane, 1,1,1-trimethylolpropane, and 1,2,4-butanetriol; the tetra(diazoacetate) esters of erythritol, pentaerythritol, and 1,2,4,6-hexanetetraol; the hexa(diazoacetate) ester of hexanehexol; the bis(diazoacetate) esters of cyclobutane-1,3-diol, cyclobutane-1,2-diol, cyclopentane-1,2-diol, cyclopentane-1,3-diol, cyclohexane-1,4-diol, cyclohexane-1,3-diol, cyclohexane-1,2-diol, cycloheptane-1,4-diol, cycloheptane-1,3-diol, cycloheptane-1,2-diol, cyclooctane-1,5-diol, cyclooctane-1,4-diol, cyclooctane-1,3-diol, 1,2-bis(hydroxymethyl) cyclohexane-1,4-bis(hydroxyethyl)cyclohexane, 1,2-bis(hydroxymethyl) cyclopentane, and 1,3-bis(hydroxymethyl)cyclopentane; the tris(diazoacetate) esters of cyclohexane-1,2,4-triol, and cycloheptane-1,3,5-triol; the tetra(diazoacetate) ester of cyclooctane-1,2,4,5-tetraol; the bis(diazoacetate) esters of hydroquinone, catechol, resorcinol, 1,2-naphthylenediol, 1,3-naphthylenediol, 1,4-naphthylenediol, 2,3-naphthylenediol, 1,6-naphthylenediol, 9,10-anthracenediol, p-bis(hydroxymethyl)benzene, m-bis(hydroxymethyl)benzene, p-bis(alpha-hydroxyethyl)benzene, o-bis(alpha-hydroxyethyl)benzene, p-hydroxymethyl phenol, p,p'-diphenol and 4,4'-dihydroxydiphenyl methane; the tris(diazoacetate) esters of hydroxy-hydroquinone and phloroglucinol; the tetra(diazoacetate) ester of 1,2,4,5-tetrahydroxybenzene; the bis(diazoacetate) esters of diethylene glycol, di(hydroxyethyl) sulfide, di(hydroxyethyl) sulfone, 4,4'-dihydroxyphenyl ether and bis(4-hydroxycyclohexyl) ether. These poly(diazoacetate) compounds can be prepared in various ways as, for example, by diazotizing the corresponding poly(amines).

Unlike azo compounds which upon heating produce a free radical, diazo compounds liberate nitrogen and produce a carbene, i.e., a carbon containing a sextet of electrons. Therefore, it is believed that the poly(diazo) compounds react by eliminating nitrogen leaving a carbene group at each end of the molecule. These free carbene groups, it is believed, react with the carbon groups in the polymers.

As stated above the polymers cross-linked in accordance with this invention are the epihalohydrin polymers including the homopolymers prepared by polymerizing a monomeric epihalohydrin, e.g., epifluorohydrin, epichlorohydrin, epibromohydrin or epiiodohydrin and copolymers in which the repeating units are derived from mixtures in any proportion of two or more molecular species of monomeric epihalohydrin such as mixtures of epichlorohydrin and epibromohydrin or mixtures of epibromohydrin, epifluorohydrin, and epiiodohydrin, etc. These polymers are readily prepared by the polymerization of epihalohydrins with, for example, organo-aluminum compounds as catalysts. Particularly effective catalysts for the polymerization of epihalohydrins are alkyl-aluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, the crystalline polymers on vulcanization tending to be hard, brittle, and lacking in elasticity. These properties are, of course, useful in the case of relatively rigid molded articles which can be prepared by molding the compounded polymer and then curing to crosslink and set it. However, excellent rubbers are obtained by vulcanizing mixtures of amorphous and crystalline polymers. In this case, the amount of the crystalline polymer is generally less than about 25-30 percent of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula:

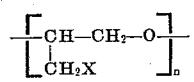

where X is halogen.

The modification of this invention can be carried out by either heating the epihalohydrin polymer plus the poly(diazo) compound above its decomposition temperature or by exposing the mixture to ultraviolet radiation. Various amounts of the poly(diazoacetate) compound can be added, the optimum amount depending on the amount of cross-linking desired, the specific poly(diazoacetate) compound employed, etc. In general, the amount added (based on the weight of the polymer) will be from about 0.05 percent to about 25 percent, most preferably from about 0.1 percent to about 10 percent.

The cross-linking agent can be incorporated with the polymer in any desired fashion; for example, it can be uniformly blended by simply milling on a conventional rubber mill. By this means the diazo compound is distributed throughout the polymer and uniform cross-linking is effected when the blend is either subjected to heat or ultraviolet radiation. Other methods of mixing the cross-linking agent with the polymer will be apparent to those skilled in the art.

The temperature at which cross-linking is effected can be varied over a wide range. When cross-linking is effected by heating, the temperature will depend on the decomposition temperature of the poly(diazoacetate). In general, the temperature will be in the range of from about 0°C. to about 250°C.

The polymers employed in this invention generally contain a small amount (i.e. from about 0.1 percent to about 2 percent by weight) of antioxidant added at the time of their preparation. It may in some cases be desirable to add a small additional amount of antioxidant at the time of cross-linking the polymer. Exemplary of the most preferred antioxidants are phenyl-beta-naphthylamine, di-beta-naphthyl-p-phenylene diamine, symmetrical-di-beta-naphthyl-p-phenylene diamine, the reaction product of diphenylamine and acetone, polymerized trimethyldihydroquinoline, and nickel dibutyl dithiocarbamate.

In addition to the poly(diazoacetate) and antioxidant other ingredients can also be incorporated. The additives commonly used in rubber vulcanizates can be used here also as for example extenders, fillers, pigments, plasticizers, stabilizers, softeners, processing lubricants, etc. The presence of a stabilizer and in particular, an acid acceptor such as a lead compound (e.g. red lead oxide, etc.), calcium stearate or magnesium oxide is particularly beneficial. Exemplary of the fillers that can be added are calcium carbonate, carbon black, silica, calcium silicate (hydrated), aluminum oxides, etc. When cross-linking is effected by irradiation, additives should be used in amounts which do not inhibit the passage of the radiation.

The following examples are presented for purposes of illustration, parts and percentages being by weight unless otherwise specified.

The extent to which the polymers are cross-linked is indicated by the percent gain in insolubility in solvents in which the uncross-linked polymer was soluble, hereinafter termed "percent gel." Percent gel is determined as follows: a weighed sample of polymer is soaked in such a solvent for a specified length of time. The sample is then removed and dried to constant weight. The weight of initial and final sample are corrected for polymer and copolymer content based on knowledge of components. From these figures (corrected dry weight/corrected initial weight) × 100 = % gel

EXAMPLE 1

This example illustrates the cross-linking of a sample of noncrystalline poly(epichlorohydrin) having a molecular weight of approximately 500,000 with an aliphatic bis(diazoacetate).

The poly(epichlorohydrin) was dissolved in methylene chloride to make up approximately a 1 percent solution. To the solution was added 2 percent by weight based on the polymer of beta-naphthyl phenylamine and the mixture agitated until complete solution was effected. The resulting solution was transferred to an evaporating dish and a methylene chloride solution of the bis(diazoacetate) ester of 1,6-hexanediol amounting to approximately two percent by weight based on the polymer was added and the solvent evaporated in a stream of nitrogen over a 4 hour period. The resulting film was cured at a temperature of 170°C. for 45 minutes under a nitrogen atmosphere. The resulting vulcanizate was tested for percent gel by soaking in methylene chloride overnight. The product had a percent gel of 74. A control sample treated exactly the same way except for the addition of the hexamethylene bis(diazoacetate) had a percent gel of 0.

EXAMPLE 2

This example illustrates the cross-linking of a sample of poly(epichlorohydrin) initiated by irradiation. To a solution of noncrystalline poly(epichlorohydrin), having a molecular weight of approximately 800,000, in toluene was added sufficient bis(diazoacetate) ester of 1,10-decanediol to make a solution containing 8 parts of the diazo compound per 100 parts of polymer. A film of the solution was spread on a quartz plate and the solvent evaporated under a stream of nitrogen. The resulting film was exposed to an ultraviolet light source under an atmosphere of nitrogen for 1 hour at a temperature of 30°C. Quartz equipment was used throughout the reaction. A control film of the poly(epichlorohydrin) containing no diazo compound was subjected to ultraviolet light exactly the same as described above. The control was completely soluble in toluene while the sample treated with diazo compound was insoluble.

EXAMPLE 3

This example illustrates the cross-linking of a sample of the noncrystalline poly(epichlorohydrin) described in Example 1 with a cycloaliphatic bis(diazoacetate).

The poly(epichlorohydrin) was dissolved in methylene chloride to make up a 1 percent solution. To the solution was added two percent by weight based on the polymer of beta-naphthyl phenylamine and the mixture agitated until complete solution was effected. The resulting solution was transferred to an evaporating dish and a methylene chloride solution of the bis(diazoacetate) ester of 1,4-cyclohexanediol amounting to approximately 5 percent by weight based on the polymer was added, the reaction mixture agitated and the solvent evaporated in a stream of nitrogen. The resulting film was cured at a temperature of 175°C. for 40 minutes under a nitrogen atmosphere. The resulting cross-linked film was substantially insoluble in methylene chloride, while a control sample treated the same way except for the addition of the bis(diazoacetate) was completely soluble in methylene chloride.

EXAMPLE 4

This example illustrates the cross-linking of a sample of amorphous epichlorohydrin--epibromohydrin copolymer containing approximately 5 mole percent of units derived from epibromohydrin and having a molecular weight of about 600,000 with an aromatic bis(diazoacetate).

To a 1 percent by weight solution of the copolymer in methylene chloride was added 2 parts of phenyl-beta-naphthylamine stabilizer and 7 parts of the bis(diazoacetate) ester of hydroquinone per 100 parts of copolymer. The resulting solution was transferred to an evaporating dish and the solvent evaporated in a stream of nitrogen. The resulting film was cured at a temperature of 180°C. for 30 minutes under a nitrogen atmosphere. The cross-linked copolymer film was substantially insoluble in methylene chloride, while a control sample treated the same way except for the addition of the bis(diazoacetate) was completely soluble in methylene chloride.

EXAMPLE 5

This example illustrates the cross-linking of a sample of amorphous poly(epibromohydrin) having a molecular weight of approximately 550,000 with an aromatic bis(diazoacetate).

To a 1 percent by weight solution of the poly(epibromohydrin) in methylene chloride was added 2 parts of nickel dibutyl dithiocarbamate and 6 parts of the bis(diazoacetate) ester of p-bis-(β-hydroxyethyl) benzene per 100 parts of polymer. The resulting solution was transferred to an evaporating dish and the solvent evaporated in a stream of nitrogen. The resulting film was cured at a temperature of 160°C. for one hour under a nitrogen atmosphere. The cross-linked polymer film was substantially insoluble in methylene chloride, while a control sample treated the same way but without the bis(diazoacetate) was completely soluble in methylene chloride.

EXAMPLE 6

This example illustrates the cross-linking of a sample of the noncrystalline poly(epichlorohydrin) described in Example 1 with an aliphatic tris(diazoacetate).

The poly(epichlorohydrin) was dissolved in methylene chloride, stabilized with β-naphthyl phenylamine, mixed with the cross-linking agent, the solvent evaporated and the resulting film cured all as described in Example 1 except the tris(diazoacetate) ester of trimethylol ethane was substituted for the bis(diazoacetate) ester used in Example 1. The cross-linked polymer film was substantially insoluble in methylene chloride, while a control sample treated the same way but without the tris(diazoacetate) was completely soluble in methylene chloride.

What I claim and desire to protect by Letters Patent is:

1. The process of cross-linking an epihalohydrin polymer selected from the group consisting of epihalohydrin homopolymers and copolymers of two or more epihalohydrins which comprises heating said polymer in admixture with from about 0.05% to about 25% based on the weight of the polymer of a poly(diazoacetate) having the general formula

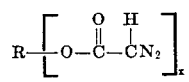

where $x$ is an integer greater than 1 and R is an organic radical selected from the group consisting of radicals derived by the removal of two or more hydrogen atoms from alkanes, cycloalkanes, alkyl substituted cycloalkanes, arenes, alkyl substituted arenes, alkylenediarenes, alkyl-oxyalkanes, aryl-oxy-arenes, alkaryl-oxy-arenes, alkaryl-oxy-alkarenes, aralkyl-oxy-alkanes, aralkyl-oxy-aralkanes, alkyl-oxy-alkarenes, alkyl-thioalkanes, aryl-thio-arenes, alkaryl-thio-arenes, alkaryl-thio-alkarenes, aralkyl-thio-alkanes, aralkyl-thio-aralkanes, alkyl-thio-alkarenes, alkyl-sulfonyl-alkanes, aryl-sulfonyl-arenes, alkaryl-sulfonyl-arenes, alkaryl-sulfonyl-alkarenes, aralkyl-sulfonyl-alkanes, aralkyl-sulfonyl-aralkanes, and alkyl-sulfonyl-alkarenes and the corresponding halo-substituted radicals.

2. The process of cross-linking an epihalohydrin polymer selected from the group consisting of epihalohydrin homopolymers and copolymers of two or more epihalohydrins which comprises irradiating said polymer under ultraviolet radiation in admixture with from about 0.05 percent to about 25 percent based on the weight of the polymer of a poly(diazoacetate) having the general formula

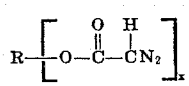

where $x$ is an integer greater than 1 and R is an organic radical selected from the group consisting of radicals derived by the removal of two or more hydrogen atoms from alkanes, cycloalkanes, alkyl substituted cycloalkanes, arenes, alkyl substituted arenes, alkylene-diarenes, alkyl-oxy-alkaney, aryl-oxy-arenes, alkaryl-oxy-arenes, alkaryl-oxy-alkarenes, aralkyl-oxy-alkanes, aralkyl-oxy-aralkanes, alkyl-oxy-alkarenes, alkyl-thio-alkanes, aryl-thio-arenes, alkaryl-thio-arenes, alkaryl-thio-alkarenes, aralkyl-thio-alkanes, aralkyl-thio-aralkanes, alkyl-thio-alkarenes, alkyl-sulfonyl-alkanes, aryl-sulfonyl-arenes, alkaryl-sulfonylarenes, alkaryl-sulfonyl-alkarenes, aralkyl-sulfonyl-alkanes, aralkyl-sulfonyl-aralkanes, and alkyl-sulfonyl-alkarenes and the corresponding halo-substituted radicals.

3. The process of claim 1 wherein the poly(diazoacetate) is the bis(diazoacetate) ester of 1,6-hexanediol.

4. The process of claim 2 wherein the poly(diazoacetate) is the bis(diazoacetate) ester of 1,10-decanediol.

5. An epihalohydrin polymer selected from the group consisting of epihalohydrin homopolymers and copolymers of two or more epihalohydrins cross-linked by reacting with from about 0.05 percent to about 25 percent based on the weight of the polymer of a poly(diazoacetate) having the general formula

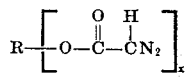

where $x$ is an integer greater than 1 and R is an organic radical selected from the group consisting of radicals derived by the removal of two or more hydrogen atoms from alkanes, cycloalkanes, alkyl substituted cycloalkanes, arenes, alkyl substituted arenes, alkylene-diarenes, alkyl-oxy-alkanes, aryl-oxy-arenes, alkaryl-oxy-arenes, alkaryl-oxy-alkarenes, aralkyl-oxy-alkanes, aralkyl-oxy-aralkanes, alkyl-oxy-alkarenes, alkyl-thio-alkanes, aryl-thio-arenes, alkaryl-thio-arenes, alkaryl-thio-alkarenes, aralkyl-thio-alkanes, aralkyl-thio-aralkanes, alkyl-thio-alkarenes, alkyl-sulfonyl-alkanes, aryl-sulfonyl-arenes, alkaryl-sulfonyl-arenes, alkaryl-sulfonyl-alkarenes, aralkyl-sulfonyl-alkanes, aralkyl-sulfonyl-aralkanes, and alkyl-sulfonyl-alkarenes and the corresponding halo-substituted radicals.

6. The product of claim 5 wherein the polymer has been reacted with the bis(diazoacetate) ester of 1,6-hexanediol.

7. The product of claim 5 wherein the polymer has been reacted with the bis(diazoacetate) ester of 1,10-decanediol.

* * * * *